United States Patent [19]
Stancil

[11] Patent Number: 5,897,663
[45] Date of Patent: Apr. 27, 1999

[54] HOST I²C CONTROLLER FOR SELECTIVELY EXECUTING CURRENT ADDRESS READS TO I²C EEPROMS

[75] Inventor: Charles J. Stancil, Tomball, Tex.

[73] Assignee: Compaq Computer Corporation, Houston, Tex.

[21] Appl. No.: 08/777,985

[22] Filed: Dec. 24, 1996

[51] Int. Cl.⁶ .................................................. G06F 9/26
[52] U.S. Cl. .................. 711/200; 711/217; 711/167; 711/154
[58] Field of Search .................................... 711/146, 154, 711/200; 365/189.03

[56] References Cited

PUBLICATIONS

"PCF8584 I²C–bus controller", Product specification, Phillips Semiconductors, (Aug. 29, 1995).
"Microchip Non–Volatile Memory Products Data Book", Microchip Technology, Inc. (May 1995).
"Peripheral Components", Intel (1996).
"The I²C–bus and how to use it", Phillips Semiconductors.
"System Management Bus Specification", Rev 0.95, Intel Corporation, (1994).

Primary Examiner—Tod R. Swann
Assistant Examiner—David Langjahr
Attorney, Agent, or Firm—Pravel, Hewitt & Kimball

[57] ABSTRACT

A computer system having a bridge and I²C EEPROMs is provided with a host I²C controller implemented in the bridge for accelerating the reading of the I²C EEPROMs. The host I²C controller accelerates the reading of I²C EEPROMs by executing current address reads of the I²C EEPROM when a requested slave address matches a current slave address stored in a current slave address register, and the requested EEPROM address matches a current EEPROM address stored in a current EEPROM address counter. The host I²C controller thus eliminates the use of software to track the read accesses of a plurality of masters to an I²C EEPROM and also eliminates the use of bus command protocols to support both random reads and current address reads to an I²C EEPROM.

41 Claims, 8 Drawing Sheets

HOST I²C CONTROLLER FOR SELECTIVELY EXECUTING CURRENT ADDRESS READS TO I²C EEPROMS

BACKGROUND OF THE INVENTION

1. Field of the Invention

The present invention relates to a host I²C controller for accelerated reading of I²C EEPROMs.

2. Description of the Related Art

Use of I²C (Inter-Integrated Circuit) devices in personal computer systems has become prevalent. Today's I²C bus is typically used to communicate with a Serial Presence Detect (SPD) device on memory modules (DIMMs), Extended System Configuration Data (ESCD) storage devices, temperature sensors, and even batteries. An SPD device may hold data on the speed, size, or type of the related module. The device typically used as an SPD device or an ESCD storage device is an I²C EEPROM.

A read access to a random address of an I²C EEPROM is referred to as a Random Read command. A Random Read command is issued by a master such as firmware running on a controller, code residing in an embedded controller, an application, or the operating system itself. According to I²C EEPROM protocol, a Random Read command requires a "dummy" byte write sequence to load a data word address into the EEPROM. The data word address informs the EEPROM of the memory location that a master is seeking to access. The "dummy" byte write also allows the master to send a control byte to the I²C EEPROM. The control byte typically includes a four bit slave type, three device select bits, and a read/write bit which is set to a write operation. Because most accesses to EEPROMs are reads from a random address, and the "dummy" byte sequence may be comprised of two or three bytes depending on the size of the EEPROM's address space, the "dummy" byte write sequence is communication overhead that has slowed data accesses to I²C EEPROMs.

I²C EEPROMs also support a Current Address Read command. A Current Address Read command is a read access to the next sequential address of the EEPROM. After each read or write operation, the address counter of an EEPROM maintains the last accessed address, incremented by a byte or word. Because the address counter already holds the address to be accessed, a Current Address Read command is executed without the overhead of the "dummy" byte write sequence. Since a Random Read command requires a "dummy" byte write sequence, a Random Read command has twice the access time of a Current Address Read command. Thus, the approach has been to reduce communication overhead by minimizing the issuance of Random Read commands.

To determine when a Current Address Read command may be issued instead of a Random Address Read command, software has been used to determine when requested data is at an address contiguous to a previously accessed EEPROM address. When a read request is to the next sequential EEPROM location, the software issues a Current Address Read command instead of a Random Read command. Because, for example, multiple portions of a system's BIOS attempt to access I²C EEPROMs through a host I²C controller, complex software has undesirably been necessary to keep track of the last EEPROM address accessed while taking account of intervening reads by those different portions of code.

Also, in order to support both a Current Address Read command and a Random Read command, two command sets had to be defined as bus command protocols. Such bus command protocols have been used with buses compatible with I²C protocol. For example, Intel has defined for its System Management Bus a first command protocol, Receive Byte, corresponding to a Current Address Read command, and a separate command protocol, Read Byte, corresponding to a Random Read command. Intel's System Management Bus has I²C as a backbone. Thus, the capability of selecting either a Random Read command or a Current Address Read command when appropriate has undesirably required code that supports two different command protocols. Further, I²C controllers, which serve as an interface between a microprocessor and an I²C bus, have not, so far as is known, played a role in tracking EEPROM read accesses.

SUMMARY OF THE INVENTION

Briefly, in accordance with the present invention, a host I²C controller of a computer system is provided with a current slave address register, a current EEPROM address counter, a slave address/EEPROM address comparator, and an accelerated I²C EEPROM control unit. These units together form an accelerated I²C EEPROM reading unit of a host I²C controller. The accelerated I²C EEPROM reading unit allows the host I²C controller to keep track of the last EEPROM address accessed, eliminating the need for software to decide when it can issue a Current Address Read command. The present invention thus has the performance advantage of issuing a Current Address Read command to an I²C EEPROM without the requirement for software overhead to support command protocols for both a Random Read command and a Current Address Read command.

In the present invention, the current slave address register stores the last slave address asserted by a master, and the current EEPROM address counter stores the last EEPROM address accessed by a master. When a read request issued by a master is received by the host I²C controller, the accelerated I²C EEPROM reading unit snoops the read request. The slave address/EEPROM address comparator then compares the stored slave address in the current slave address register with the requested slave address to determine whether access to the I²C EEPROM last accessed is being requested. If the requested slave address matches the stored slave address, then the address comparator compares the requested EEPROM address to the stored EEPROM address in the current EEPROM address counter.

If there is a match, a Current Address Read command is executed, even though a Current Address Read command was not issued. If the read access is to a slave device that is not an EEPROM or the read access is to an EEPROM whereby there is an address mismatch or a device select mismatch, a Random Read command is executed. Thus, the host I²C controller of the present invention executes Current Address Reads when appropriate without the need for issuance of a Current Address Read command by a master.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
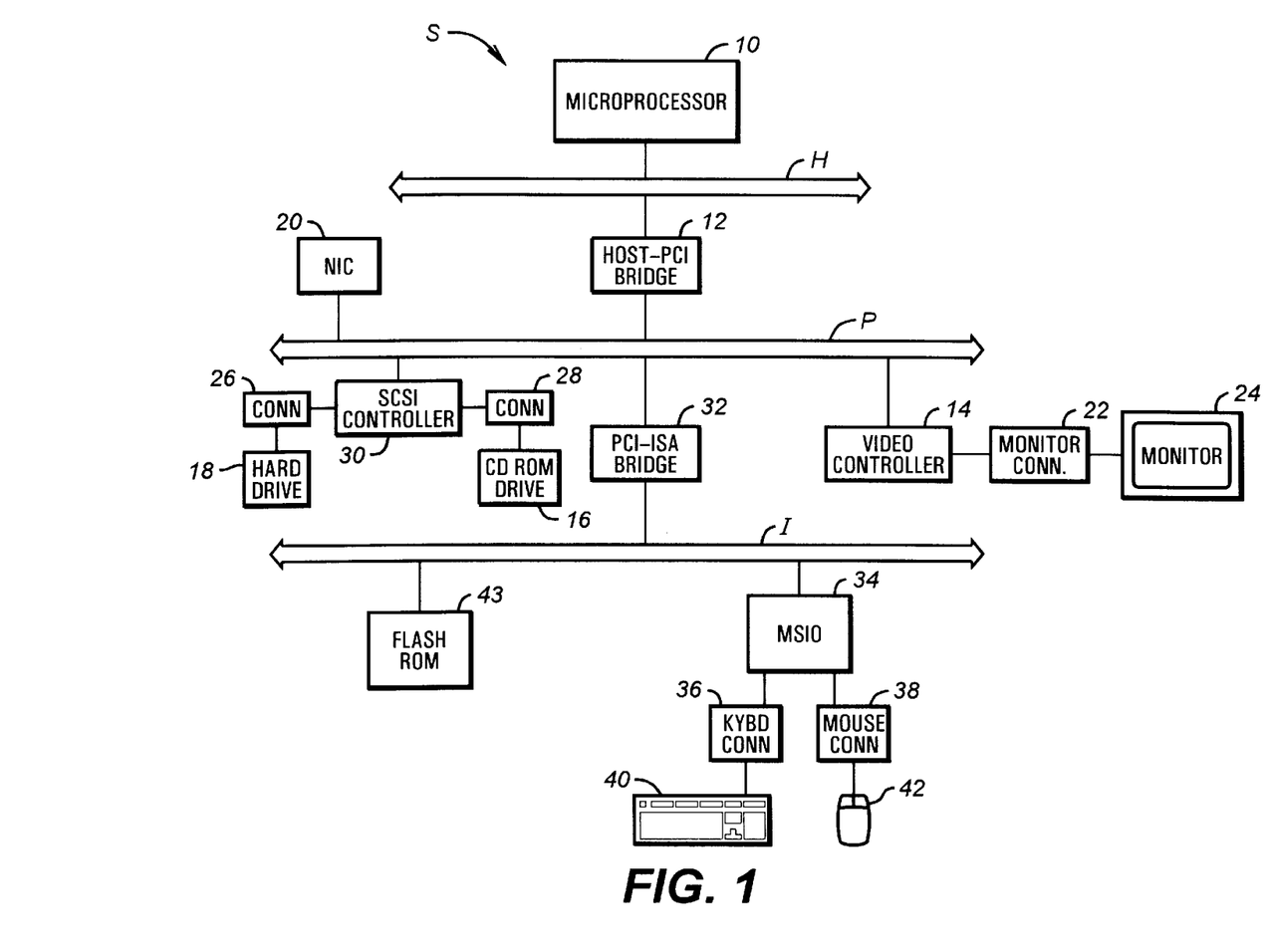
FIG. 1 is a schematic diagram of a computer system having a PCI-ISA bridge of the present invention.

Turning now to the drawings, FIG. 1 shows a computer system S according to the present invention. Within the computer system S, a high speed host bus H is connected to a microprocessor 10. The microprocessor 10 preferably operates with a standard IBM-PC compatible operating system, such as MS-DOS or Windows. The host bus H is also connected to a host-PCI bridge 12, which is provided to convert signals between the host bus H and a PCI bus P.

The PCI bus P is connected to a video controller 14, a CD ROM drive 16, a hard drive 18, and a Network Interface Controller 20 (NIC). The video controller 14 through a monitor connector 22 provides control signals to a monitor 24. The hard drive 18 and the CD ROM drive 16 both have SCSI connectors 26 and 28 which are connected to a SCSI controller 30. The SCSI controller 30 which is connected to the PCI bus P may act as a PCI bus master or slave.

The input-output bus in the computer system S is preferably the Industry Standard Architecture (ISA) bus I which is connected to the PCI bus P through a PCI-ISA bridge 32. The PCI-ISA bridge 32 preferably acts as a PCI bus master and slave, an ISA bus controller, and an ISA bus arbiter. It should be understood that other input/output busses such as the Extended Industry Standard Architecture (EISA) bus and related bridges may also be used.

The ISA bus I which is connected to the PCI-ISA bridge 32 connects to a Super I/O (SIO) chip 34. The SIO 34 provides a keyboard connector 36 and a mouse connector 38. Connected to the keyboard connector 36 is a keyboard 40, and a mouse 42 is connected to the mouse connector 38. The SIO 34 is preferably integrated into the PCI-ISA bridge 32. Also coupled to the ISA bus I is an Electrically Erasable Programmable Read Only Memory 43 (EEPROM). The EEPROM 43 is used to store various codes and data, such as system BIOS code, and it is preferably a a parallel, byte-wide device such as a Flash ROM.

In addition, the computer system S includes at least one I²C EEPROM. I²C EEPROMs may serve as Serial Presence Detect (SPD) devices on memory modules and as Extended System Configuration Data (ESCD) storage devices. Details of the I²C protocol can be found in "The I²C Bus and How to Use It (Including Specification)," published by Phillips Semiconductors, January 1992. It should be understood that a bus having an I²C backbone refers to a bus which operates in accordance with I²C protocol or a protocol compatible with I²C protocol.

Figure 2:
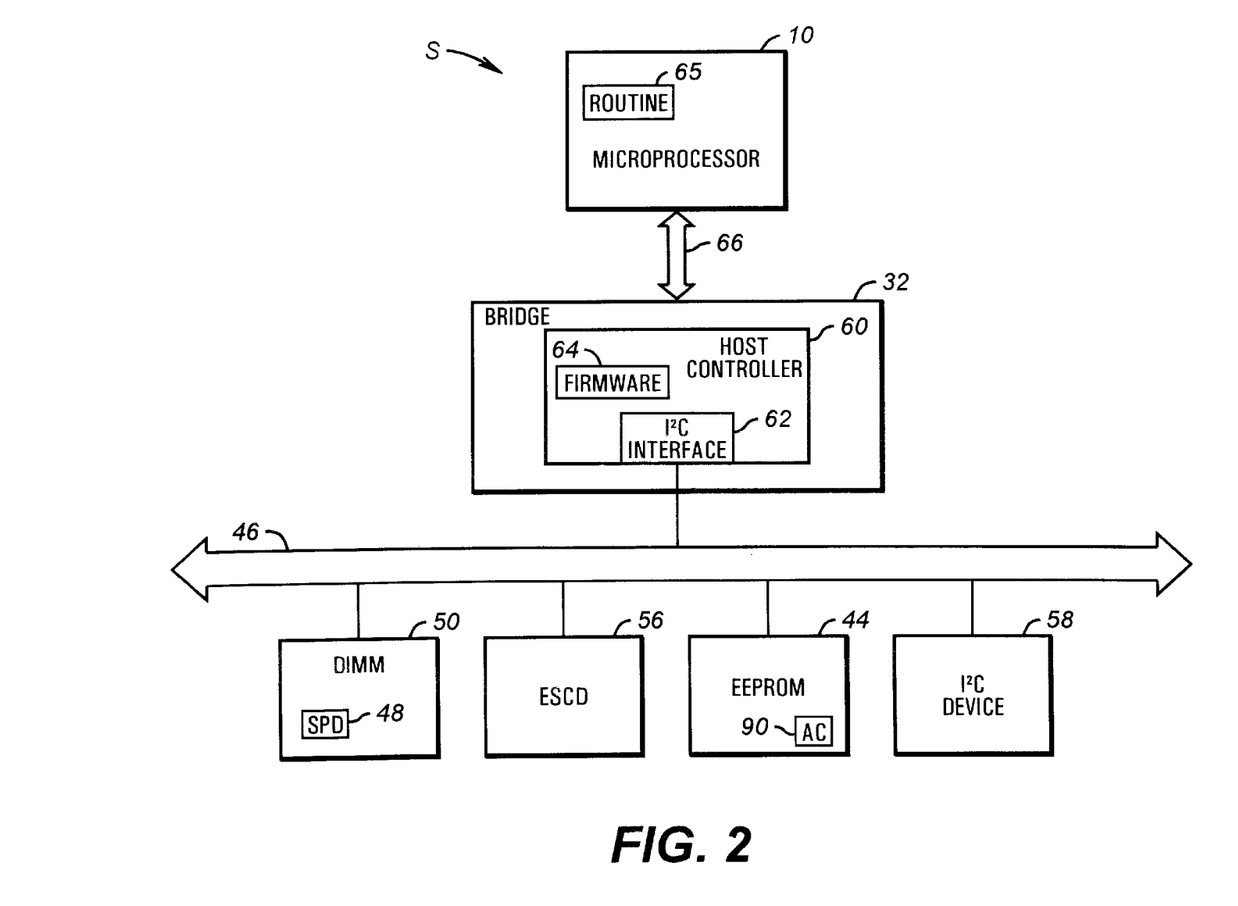
FIG. 2 is a schematic diagram of the I²C protocol layer of the computer system of FIG. 1.

As I²C EEPROMs adhere to an I²C protocol, the I²C protocol layer of the computer system S of the present invention is shown in FIG. 2. A bus 46 having an I²C backbone is coupled to an EEPROM 48 used as a SPD device for a device on memory module 50. The bus 46 is also connected to a basic I²C EEPROM 44 having an internal address counter 90 and further connected to an I²C EEPROM 56 used as an ESCD storage device. Other uses of I²C EEPROMs in computer systems are also well known. In addition to I²C EEPROMs, the bus 46 is connected to an I²C device 58 such as an LCD driver, SRAM or a voice synthesizer. Thus, in addition to the in-band signaling shown in FIG. 1, the computer system provides an I²C protocol layer for out-band signaling. The out-band signaling allowed by an I²C protocol layer permits a microprocessor 10 to communicate with a host controller 60 that directly communicates with a particular device in the computer system S.

A host I²C controller 60 through an I²C interface 62 is connected to the contemporary bus 46 having an I²C backbone, as noted above. Preferably, the I²C interface 62 is integrated on the host I²C controller 60. An example of a contemporary bus 46 having an I²C backbone is Intel's System Management Bus. The System Management Bus has a Read Byte command protocol corresponding to a random read command and a Receive Byte protocol corresponding to a current address read command. Details of the System Management Bus can be found in the "System Management Bus Specification," published by Intel Corporation, February 1995.

The host I²C controller 60 is preferably implemented in the PCI-ISA bridge 32. It can be appreciated, however, that the host I²C controller 60 may be implemented in other bridge circuitry. Firmware 64 in the host I²C controller 60 typically serves as a master for an I²C EEPROM. Further details on I²C controllers can be gathered from the "PCF8584 I²C-bus Controller Data Sheet," published by Phillips Semiconductors, August 1995.

Read requests to I²C EEPROMs may originate from sources other than firmware 64 in the host I²C controller 20. For example, read requests to an I²C EEPROM may be issued by an operating system or a routine 65 residing in the microprocessor 10. The microprocessor 10 communicates with the host I²C controller 60 by connecting to the PCI-ISA bridge 32 through a serial or parallel bus 66.

To more clearly illustrate the computer features and operation of the present invention, typical conventional computer devices and subsystems are not shown in FIG. 2. Further, while the architecture of the computer system S is preferably a PCI architecture, other computer architectures known in the art are contemplated.

Figure 3:
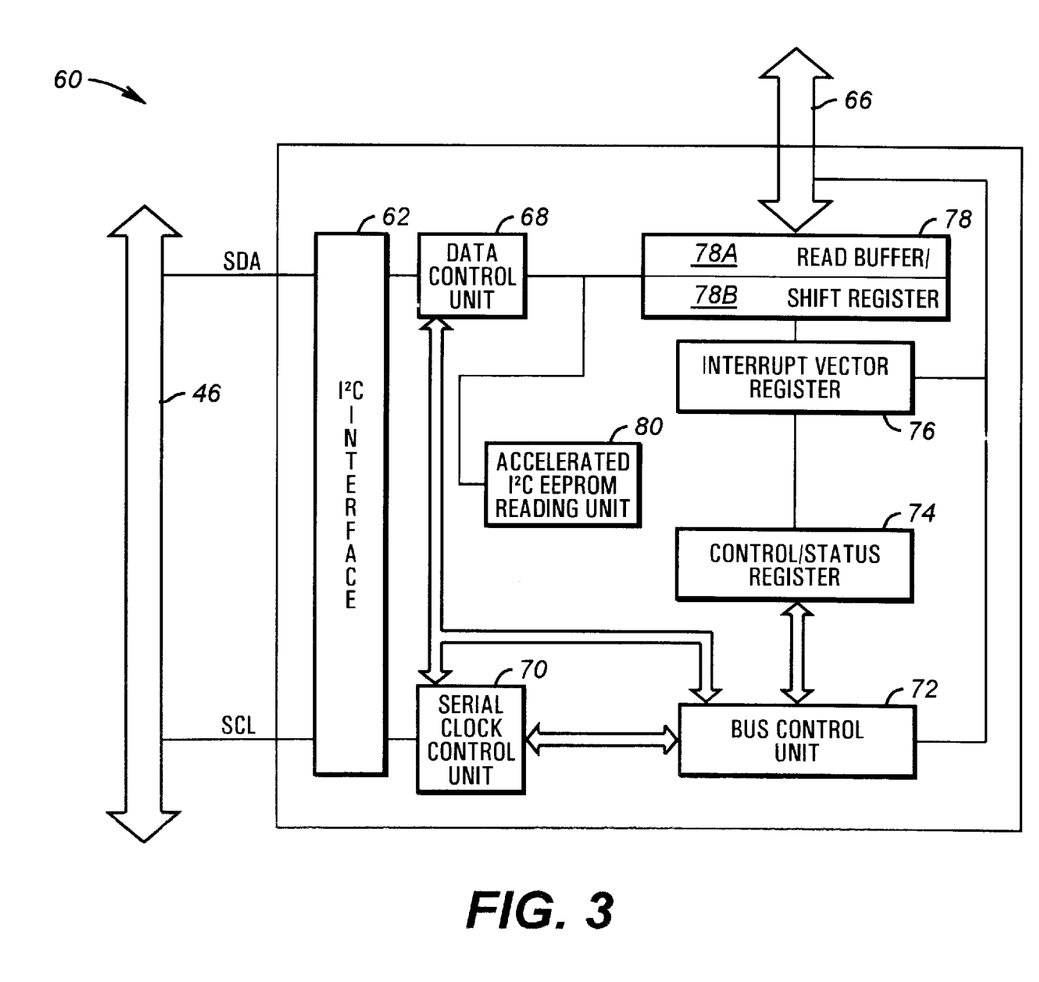
FIG. 3 is a schematic diagram of a host I²C controller of FIG. 2.

Referring to FIG. 3, the host I²C controller 60 of FIG. 2 is shown in more detail. The host I²C controller 60 receives serial data signals over a serial data line SDA and serial clock signals over a serial clock line SCL from the bus 46. Within the host I²C controller 60, the serial data line SDA and the serial clock line SCL are connected to the I²C interface 62, which allows communication between the host I²C controller 60 and the bus 46.

The I²C interface 62 is also connected to a data control unit 68 and a serial clock control unit 70. Both the data control unit 68 and the serial clock unit 70 are connected to each other and are also connected to a bus control unit 72. The bus control unit 72 controls the bus 66 between the host I²C controller 60 and the microprocessor 10. This bus 66 may be either a parallel bus or a serial bus. In addition, the microprocessor 10 is provided with status information on the bus 46 by a control/status register 74 coupled to the bus control unit 72.

The bus control unit 72 is also coupled to an interrupt vector register 76. The interrupt vector register 76 provides an interrupt signal to the microprocessor 10 through the bus 66 when the I²C controller 60 has a full buffer 78 of serial data from the bus 46. Data received from an I²C EEPROM such as that shown at 44 in FIG. 2 by the host I²C controller 60 is temporarily stored in the read buffer portion 78A of the read buffer/shift register 78.

An accelerated I²C EEPROM reading unit 80 is connected to the data control unit 68 and to the read buffer/shift register 78. The accelerated I²C EEPROM reading unit 80 snoops each read request signal received by the host I²C controller 60 a byte at a time.

Figure 4:
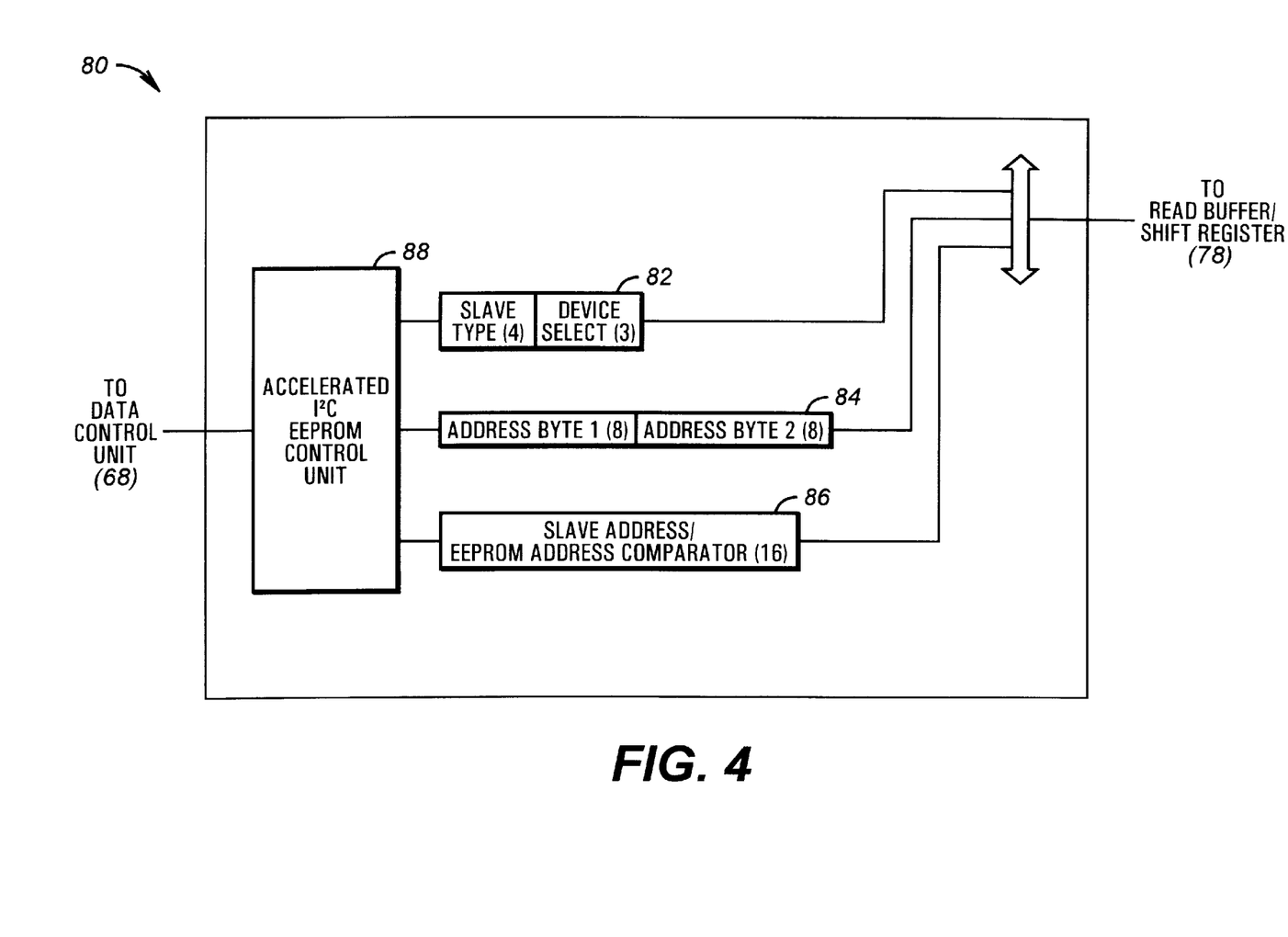
FIG. 4 is a schematic diagram of an accelerated I²C EEPROM reading unit of the host I²C controller of FIG. 3.

Referring to FIG. 4, the accelerated I²C EEPROM reading unit 80 of FIG. 3 can be seen to include a current slave address register 82, a current EEPROM address counter 84, a slave address/EEPROM address comparator 86, and an accelerated I²C EEPROM control unit 88. The accelerated I²C EEPROM control unit 88 provides control logic signals to the other components of unit 80 in the manner known in the art. Also, in order to determine when control signals should be provided, the accelerated I²C EEPROM control unit 88 communicates with the data control unit 68, as discussed above with reference to FIG. 3.

When a master makes a read request to an EEPROM such as that shown at 44 in FIG. 2, the master sends a slave address and an EEPROM address. The current slave address register 82 (FIG. 4) in reading unit 80 stores the slave address of the previously requested slave. The current slave address register 82 is preferably a 7-bit register. The four most significant bits represents a field for the slave type code. If the slave type code is 1010, for example, the slave is a contemporary EEPROM. The three least significant bits represent a field for the device select code. The EEPROM 44 has its own device select code.

The current EEPROM address counter 84 stores the EEPROM address of the previously requested EEPROM. The current EEPROM address counter 84 is preferably a sixteen-bit counter. The eight most significant bits represent a field for the first address byte. The eight least significant bits represent a field for the second address byte.

When the requested slave address does not match the stored slave address and the slave type code corresponds to an EEPROM, the requested slave address is stored in the current slave address register 82. Similarly, when the requested EEPROM address does not match the stored EEPROM address, the requested EEPROM address is stored in the current EEPROM address counter 84. The requested EEPROM address is then compared to the stored EEPROM address if the requested slave address matches the stored slave address. The respective comparisons between the stored slave address and the stored EEPROM address with a requested slave address and a requested EEPROM address are performed by a slave address/EEPROM address comparator 86. The comparator 86 is preferably a twenty-three-bit comparator.

The current EEPROM address counter 84, like the internal address counter 90 of the I²C EEPROM 44 (FIG. 2), maintains the address of the last byte accessed incremented by one byte. However, unlike the internal address counter 90 of the EEPROM 44, the current EEPROM address counter 84 in conjunction with the current slave address register 82 tests whether a requested EEPROM address is the previously requested EEPROM address accessed by any of a plurality of masters.

Figure 5:
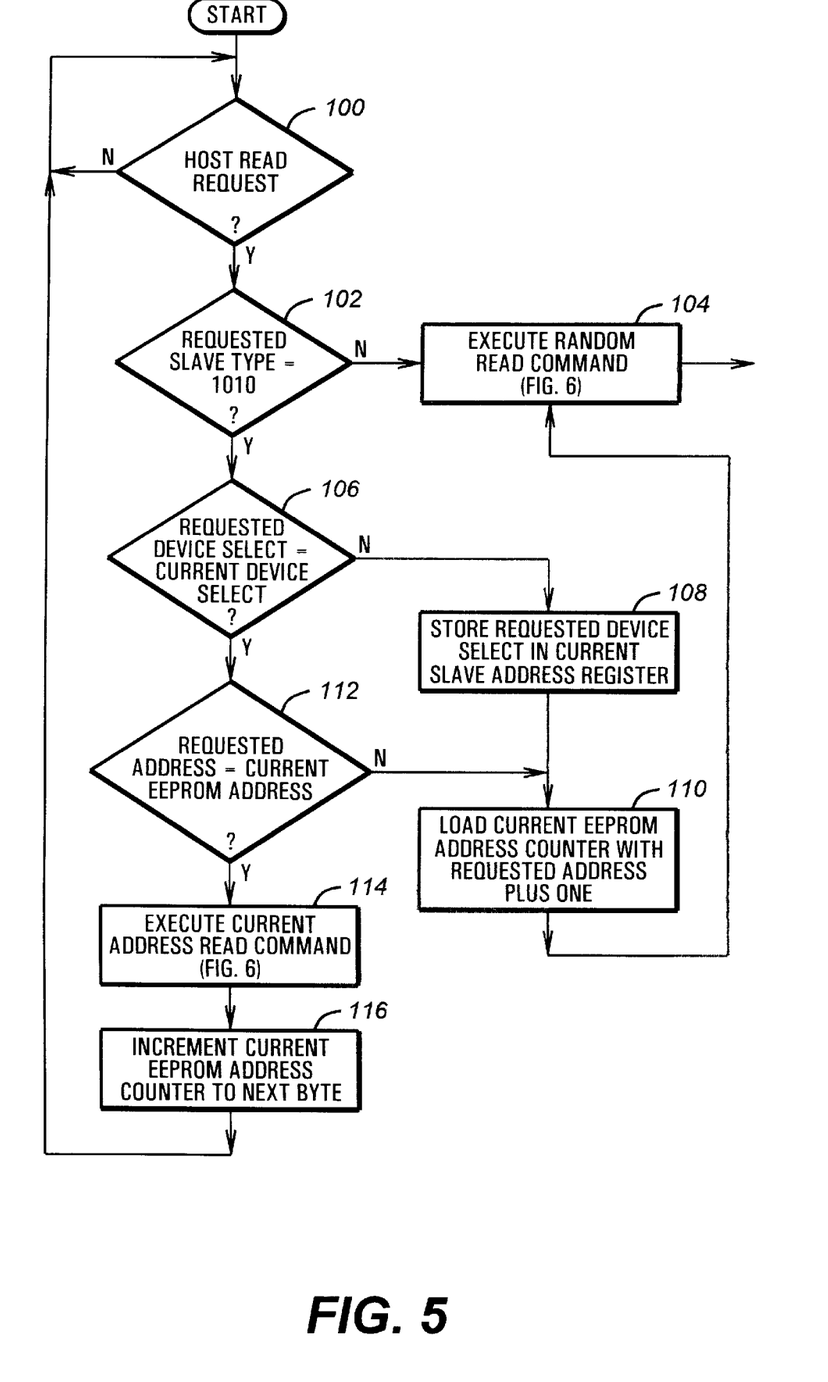
FIG. 5 is a flow chart of the hard-wired, coded process for accelerated reading of an I²C EEPROM which is executed by the host I²C controller of FIG. 3.

FIG. 5 is a flow chart of the hard-wired coded process for accelerated reading of an I²C EEPROM 44 which is executed by the host I²C controller 60 of FIGS. 2 and 3. The process begins at step 100 where it is determined whether a read request signal has been received by the host I²C controller 60. Read requests by a master to an I²C device are routed through the host I²C controller 60. If a host request has not been received, the control remains at step 100. If a read request has been received, control proceeds to step 102.

At step 102 it is determined from the code whether the requested slave is an EEPROM. This determination is made by comparing the requested slave type with the slave type code indicative of an EEPROM. As noted above, the slave type code for a contemporary EEPROM is 1010. The requested slave type preferably is found in the four most significant bits of the requested slave address. In accordance with I²C protocol, the slave address is a 7-bit address. While a 10-bit slave address as permitted by I²C protocol is contemplated, a 7-bit address is preferred because less hardware complexity is required for address decoding and less communication overhead is needed. If the requested slave type code is not 1010 or any code indicative of an EEPROM, then control proceeds to step 104.

At step 104, the host I²C controller 60 executes a random read command. Since the host controller 60 is designed to track accesses to EEPROMs, the slave type of the requested slave for this step is not stored in the current slave address register 82. These four bits are instead "hard-wired" in the current slave address register 82, and if the requested slave type is 1010, then control proceeds to step 106. At step 106, the requested device select code is compared to the current device select code stored in the current slave address register 82. A match at this step indicates that the requested EEPROM is the previously accessed EEPROM. The master seeking to access the requested EEPROM may be different from the master which accessed the previously accessed EEPROM. If there is a device select mismatch indicating that the requested EEPROM is not the previously accessed EEPROM, then control proceeds to step 108. At step 108, the requested device select code is stored in the current slave address register 82. This permits the host I²C controller 60 to keep track of the previously accessed EEPROM, for each EEPROM has its own device select code. The requested slave type is not stored since a slave type match is required to reach this step.

Control then passes to step 110 wherein the requested EEPROM address plus one is stored in the current EEPROM address counter 84. One is added to the requested EEPROM address because the next action will be to execute a random read from the EEPROM, so that the EEPROM's internal address counter will then point to the next element. If the next host read request is to the next byte of the EEPROM, the then requested address will equal the current EEPROM address at step 112, discussed below, so a current address read command can be executed instead of a random read command. Thus, the current EEPROM address counter permits the host I²C controller 60 to keep track of the previously accessed EEPROM address. Thus, there is no need for software to do so. Next, control returns to step 104 where a random read command is executed.

If there is a device select match in step 106, then control passes to step 112. At step 112, the requested EEPROM address is compared to a current EEPROM address stored in the current EEPROM address counter 84. If there is an address mismatch, control passes to step 110. An address mismatch indicates that although the requested EEPROM is a previously accessed EEPROM, the requested EEPROM address is not the previously accessed EEPROM address plus one. Therefore, a current address read command should not be executed. In step 110, the requested EEPROM address is loaded into the current EEPROM address counter 84. Control then returns to step 104 where a random read command is executed.

Figure 6:
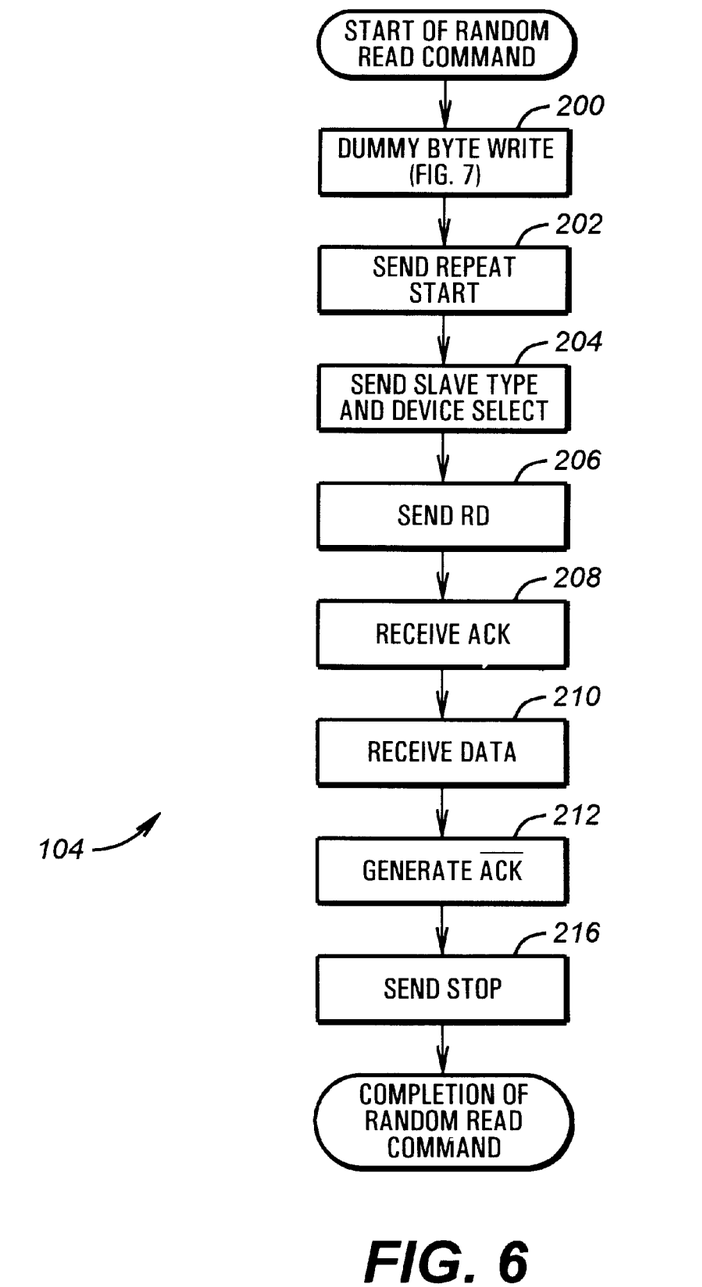
FIG. 6 is a flow chart of the Random Read command to an I²C EEPROM which is executed by the host I²C controller of FIG. 3.
Figure 7:
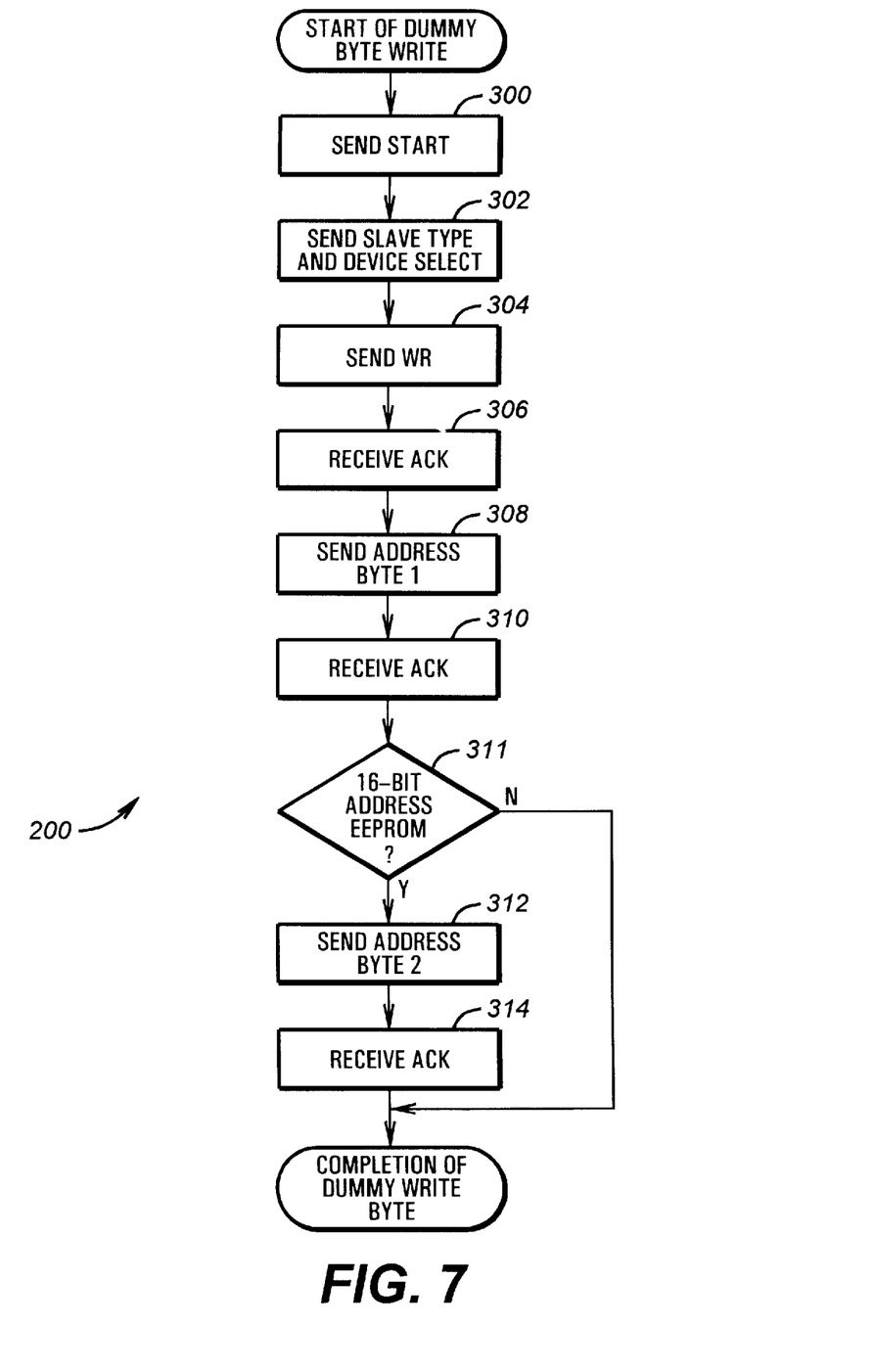
FIG. 7 is a flow chart of the "dummy byte" write sequence of the Random Read command of FIG. 6.

A flow chart of details of the random read command step 104 of FIG. 5 executed by the I$^2$C host controller 60 is shown in FIG. 6. The random read command 104 begins at step 200 wherein there is a dummy byte write sequence. A flow chart of details of the dummy byte write sequence step 200 of FIG. 6 is shown in FIG. 7. The dummy byte write sequence begins with a generation of a start signal at step 300. Control then passes to step 302 where the slave type code and the device select code comprising the slave address of a requested slave are sent to the EEPROM 44. This is done by loading the slave address into the shift register portion 78A of the read buffer/shift register 78, and then shifting the slave address onto the bus 46 through the data control unit 68.

Next, control passes to step 304 where a write bit WR is sent to the EEPROM 44. Control then passes to step 306. At step 306, the EEPROM 44 generates an acknowledge signal ACK which is transmitted to the master indicating a readiness for receipt of the information to be transmitted. Following the acknowledgement in step 306, control passes to step 308. In step 308, the first byte of the requested address is sent to I$^2$C EEPROM 44. Upon receipt of that address byte, the EEPROM 44 generates an acknowledge signal ACK which is received by the master in step 310. Next, control passes to step 311 where it is determined if an additional eight address bits are needed to address the EEPROM 44. If the master is seeking to access an EEPROM 44 having a 16-bit address, the master informs the host I$^2$C controller 60 as such. Then, control passes to step 312 wherein the second byte of the requested address is sent to the EEPROM 44. Upon receipt of the second address byte, the EEPROM 44 in step 314 generates an acknowledge signal ACK which is sent to the master. In step 311, if the requested EEPROM has an 8-bit address, the dummy byte write is complete, so control instead bypasses steps 312 and 314.

Returning to FIG. 6, after the dummy byte write sequence step 200 is performed in the manner disclosed in FIG. 7, the host controller 60 sends a repeat start condition to the I$^2$C EEPROM 44 in step 202. Control then passes to step 204 wherein the slave address containing the slave type code and the device select code is again sent to the EEPROM 44. Next, in step 206, a read bit RD indicating a read operation is also sent to EEPROM 44. Upon receipt of the read bit RD, in step 208, the EEPROM 44 sends an acknowledge signal ACK to the master indicating a readiness for receipt of the data. Control then passes to step 210 wherein the EEPROM 44 sends data from a memory location corresponding to the requested EEPROM address to the master. Control then passes to step 212 where the master issues a negative acknowledge signal ACK__. Next, control passes to step 216 wherein a stop signal is sent to the EEPROM 44 indicating the completion of the data transfer.

Figure 8:
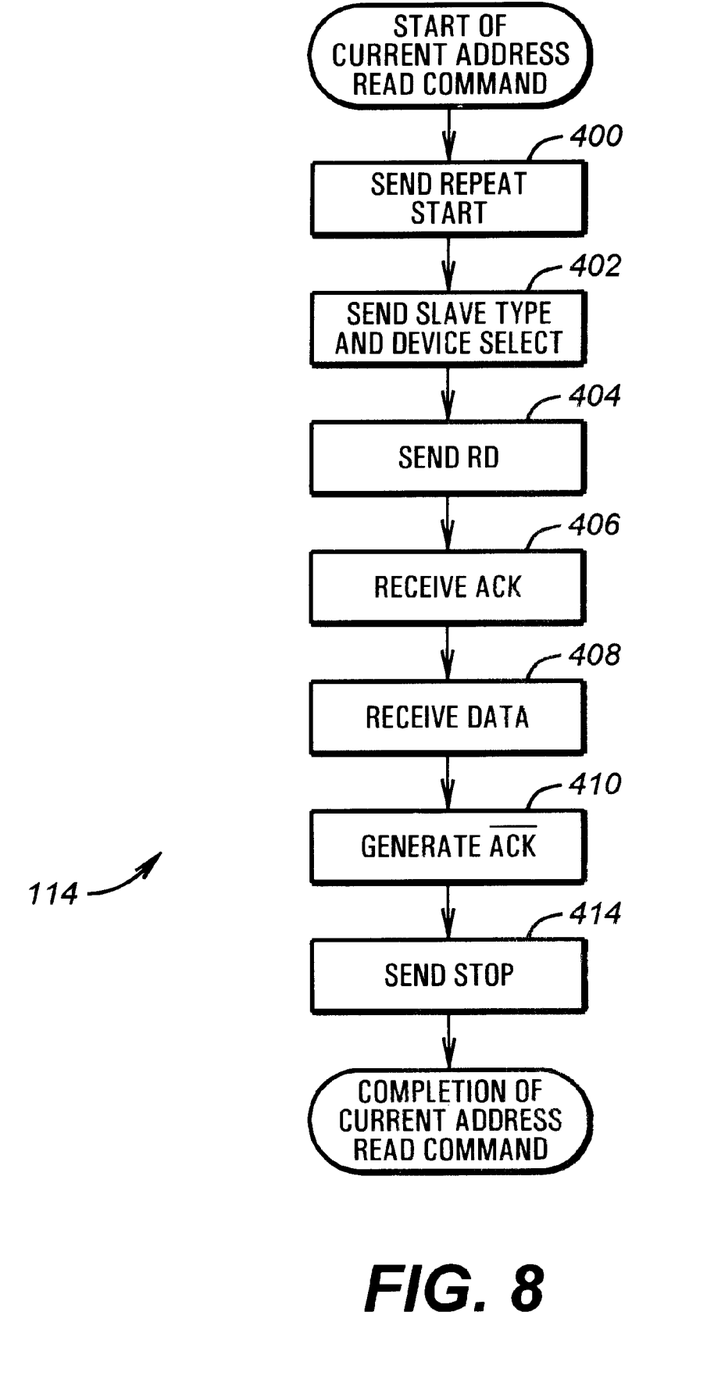
FIG. 8 is a flow chart of the Current Address Read command to an I²C EEPROM which is executed by the host I²C controller of FIG. 3.

Returning to FIG. 5, if there is an address match in step 112 after step 106 discussed above, then control passes to step 114. In step 114, the current address read command is executed. Since the host I$^2$C controller 60 determines when execution of a current address read command is needed, software for tracking EEPROM accesses and command protocols such as the System Management Bus' Receive Byte are no longer needed. A flow chart of the current address read command 114 to the EEPROM 44 which is executed by the host I$^2$C controller is shown in FIG. 8. Unlike a random read command, a current address read command does not include a dummy byte write sequence. Thus, a current address read command has half the communication overhead of a random read command.

The process of read command 114 begins at step 400 wherein a repeat start condition is sent to the EEPROM 44. Control then passes to step 402. In step 402, the requested slave type code and the requested device select code are sent to the EEPROM. Next, control proceeds to step 404 where a read bit RD indicating a read operation is sent to the EEPROM 44. From step 404 the control passes to step 406 wherein the EEPROM 44 generates an acknowledge signal ACK__ that is sent to the master. Control then passes to step 408 wherein the EEPROM 44 sends data to the master. The transmitted data is from a memory location corresponding to the requested EEPROM address that is already stored in the current EEPROM address counter 84. Control now proceeds to step 410 where the master issues a negative acknowledge signal ACK__. Control then passes to step 414, where the master sends a stop condition to the EEPROM 44.

Returning to FIG. 5, once the current address read command 114 has been executed, control passes to step 116. At step 116, the current EEPROM address counter 84 is incremented to the next byte. By incrementing the current EEPROM address counter 84 after each current address read command is executed, the host I$^2$C controller 60 maintains the previously accessed EEPROM address incremented by one byte. This matches the contents of the current EEPROM address counter 84 of the host I$^2$C controller 60 with the internal address counter 90 of the EEPROM 44, permitting the controller 60 to determine when a current address read should be executed. Control then loops to step 100 for the next read request.

Thus, in accordance with the present invention, an accelerated I$^2$C EEPROM reading unit 80 allows a host I$^2$C controller 60 to keep track of the last EEPROM address accessed, eliminating the need for software to decide when it can issue a current address read command. The present invention has the performance advantage of issuing a current address read command to an I$^2$C EEPROM without software overhead to support command protocols for both a random read command and a current address read command.

In the present invention, the current slave address register 82 stores the previous slave address asserted by a master, and the current EEPROM address counter 84 stores the previously accessed EEPROM address. The slave address/EEPROM address comparator 86 then compares the stored slave address in the current slave address register 82 with a requested slave address in order to determine whether the next sequential EEPROM address is being requested. If the requested slave type code and the requested device select code match the slave address stored in the current slave address register 82, then the requested EEPROM address is compared to the stored EEPROM address in the current EEPROM address counter 84. If there is an address match, a current address command is executed, even though a current address command has not been issued. Thus, software to determine when a current address read should be issued is no longer required. After the execution of a current address read command, the current EEPROM address counter 84 is incremented to the next byte. If the read access is to a slave device that is not an EEPROM, the read access is to a EEPROM whereby there is a device select mismatch, or the read access is to an EEPROM whereby there is an address mismatch, then a random read command is executed.

Although the present invention discloses the host I$^2$C controller 60 as implemented in the PCI-ISA bridge 32, it should be understood that implementation in other bridge circuitry may also be used. Further, although the preferred embodiment shows a single accelerated I²C EEPROM reading unit 80, the present invention contemplates a plurality of accelerated I²C EEPROM reading units 80 associated with a plurality of I²C EEPROMs in a computer system such as those shown by 44, 48, and 56 in FIG. 2.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A computer system, comprising:
   a first bus;
   a processor coupled to said first bus;
   a mass storage device coupled to said processor;
   a second bus;
   a bridge coupled between a first bus and a second bus;
   a third bus having an I²C (inter-integrated circuit) backbone coupled to said bridge;
   an I²C EEPROM coupled to said third bus;
   a host I²C controller in said bridge coupled to said third bus, said host I²C controller comprising:
      an I²C interface coupled to said third bus for allowing communication between a host I²C controller and said third bus;
      a data control unit coupled to said I²C interface for controlling data signals on a serial data line of said third bus;
      a clock control unit coupled to said I²C interface for controlling clock signals on a serial clock line of said third bus;
      a bus control unit coupled to said data control unit, coupled to said clock control unit, and further coupled to a first bus, said bus control unit providing control signals to a bus between said host I²C controller and said processor, to said clock control unit, and to said data control unit; and
      an accelerated I²C EEPROM reading unit coupled to said data control unit for receiving, storing, and comparing slave addresses and EEPROM addresses and selectively executing current address reads of said I²C EEPROM based on the values of said slave addresses and said EEPROM addresses.

2. The computer system of claim 1, wherein said accelerated I²C EEPROM reading unit comprises:
   a current slave address register for storing the slave type code and device select code of the current slave device accessed by a read operation;
   a current EEPROM address counter for storing the address of the current EEPROM accessed by a read operation;
   a slave address/EEPROM address comparator for comparing a requested slave address with said stored current slave address and for comparing a requested EEPROM address with said stored current EEPROM address; and
   an accelerated I²C EEPROM control unit for providing control signals to said current slave address register, to said current EEPROM address counter, to said slave address/EEPROM address comparator, and to said data control unit, wherein said current EEPROM address counter is incremented after each current address read of said I²C EEPROM.

3. The computer system of claim 2, said computer system having a system processor, wherein software running on the system processor issues random read commands.

4. The computer system of claim 2, said computer system having an embedded microcontroller, wherein code residing in the embedded microcontroller issues random read commands.

5. The computer system of claim 2, said computer system having an application, wherein the application issues random read commands.

6. The computer system of claim 2, said computer system having an operating system, wherein the operating system issues random read commands.

7. The computer system of claim 2, said computer system having a memory module, wherein said I²C EEPROM is the serial presence detect device of the memory module.

8. The computer system of claim 2, wherein the first bus is a PCI bus, the second bus is an ISA bus, and the bridge is a PCI-ISA bridge.

9. The computer system of claim 2, wherein the first bus is a PCI bus, the second bus is an EISA bus, and the bridge is a PCI-EISA bridge.

10. The computer system of claim 2, wherein said host I²C controller further comprises:
    a plurality of accelerated I²C EEPROM reading units associated with a plurality of I²C EEPROMs.

11. The computer system of claim 2, wherein said computer system further comprises:
    a plurality of masters, each master capable of accessing said I²C EEPROM.

12. The computer system of claim 1, wherein:
    said accelerated I²C EEPROM reading unit stores a current slave address when said host I²C controller accesses a slave device for a read operation, stores a current EEPROM address if said slave device is an I²C EEPROM, compares a requested slave address with said stored current slave address, compares a requested EEPROM address with said stored current EEPROM address if said requested slave address matches said stored current slave address, executes a current address read of an I²C EEPROM corresponding to said requested slave address if said requested EEPROM address matches said stored current EEPROM address, executes a random read of an I²C EEPROM corresponding to said requested slave address if said requested slave address does not match said stored current EEPROM address, executes a random read of the I²C EEPROM corresponding to said requested slave address if the requested device select code does not match the stored device select code, and executes a random read of a slave corresponding to said requested slave address if the requested slave type code does not match the stored slave type code; and
    wherein said stored current slave address includes a slave type code and a stored device select code.

13. A bridge, comprising:
    an I²C (inter-integrated circuit) interface providing communication between a bus having an I²C backbone and a host I²C controller;
    an I²C EEPROM coupled to said bus having an I²C backbone;
    a host I²C controller, said controller coupled to a bus which is coupled to a system processor, said controller further coupled to said I²C interface, comprising:

an I²C interface coupled to a bus having an I²C backbone allowing communication between a host I²C controller and said bus having an I²C backbone;

a data control unit coupled to said I²C interface for controlling data signals on a serial data line of said bus having an I²C backbone;

a clock control unit coupled to said I²C interface for controlling clock signals on a serial clock line of said bus having an I²C backbone;

a bus control unit coupled to said data control unit, coupled to said clock control unit, and further coupled to a bus which is coupled to a system processor, said bus control unit providing control signals to a bus between said host I²C controller and said system processor, to said clock control unit, and to said data control unit; and an accelerated I²C EEPROM reading unit coupled to said data control unit for receiving, storing, and comparing slave addresses and EEPROM addresses and selectively executing current address reads of said I²C EEPROM based on the values of said slave addresses and said EEPROM addresses.

14. The bridge of claim 13, wherein said accelerated I²C EEPROM reading unit stores a current slave address when said host I²C controller accesses a slave device for a read operation, stores a current EEPROM address if said slave device is an I²C EEPROM, compares a requested slave address with said stored current slave address, compares a requested EEPROM address with said stored current EEPROM address if said requested slave address matches said stored current slave address, executes a current address read of an I²C EEPROM corresponding to said requested slave address if said requested EEPROM address matches said stored current EEPROM address, executes a random read of an I²C EEPROM corresponding to said requested slave address if said requested slave address does not match said stored current EEPROM address, executes a random read of the I²C EEPROM corresponding to said requested slave address if the requested device select code does not match the stored device select code, and executes a random read of a slave device corresponding to said requested slave address if the requested slave type code does not match the stored slave type code; and wherein said stored current slave address includes a stored slave type code and a stored device select code.

15. The bridge of claim 13, wherein said accelerated I²C EEPROM reading unit comprises:

a current slave address register for storing a slave type code and a device select code of a current slave device accessed by a read operation;

a current EEPROM address counter for storing the address of a current EEPROM accessed by a read operation;

a slave address/EEPROM address comparator for comparing a requested slave address with a stored current slave address and for comparing a requested EEPROM address with a stored current EEPROM address; and an accelerated I²C EEPROM control unit for providing control signals to said current slave address register, to said current EEPROM address counter, to said slave address/EEPROM address comparator, and to said data control unit, wherein said current EEPROM address counter is incremented after each current address read of said I²C EEPROM.

16. The bridge of claim 13, wherein said I²C interface is implemented as a chip on said host I²C controller.

17. The bridge of claim 15, wherein said current slave address register is a seven bit register.

18. The bridge of claim 17, wherein the four most significant bits of said current slave address register is a field for said slave type code.

19. The bridge of claim 17, wherein the three least significant bits of said current slave address register is a field for said device select code.

20. The bridge of claim 15, wherein said current EEPROM address counter is a sixteen bit counter.

21. The bridge of claim 20, wherein the eight most significant bits of said current EEPROM address counter is a field for the first address byte.

22. The bridge of claim 20, wherein the eight least significant bits of said current EEPROM address counter is a field for the second address byte.

23. The bridge of claim 15, wherein said slave address/EEPROM address comparator is a twenty-three bit comparator.

24. The bridge of claim 13, wherein said accelerated I²C EEPROM reading unit snoops read requests to a slave device a byte at a time.

25. A host inter-integrated circuit (I²C) controller, adapted to be coupled to a bus having an I²C backbone, and further to be coupled to a bus which is coupled to a system processor in a computer system, said bus having an I²C backbone being coupled to an I²C EEPROM, said controller comprising:

an I²C interface coupled to a bus having an I²C backbone allowing communication between a host I²C controller and a bus having an I²C backbone;

a data control unit coupled to said I²C interface for controlling data signals on a serial data line of said bus having an I²C backbone;

a clock control unit coupled to said I²C interface for controlling clock signals on a serial clock line of said bus having an I²C backbone;

a bus control unit coupled to said data control unit, coupled to said clock control unit, and further coupled to a bus which is coupled to a system processor, said bus control unit providing control signals to a bus between said host I²C controller and said system processor, to said clock control unit, and to said data control unit; and an accelerated I²C EEPROM reading unit coupled to said data control unit for receiving, storing, and comparing slave addresses and EEPROM addresses and selectively executing current address reads of the I²C EEPROM based on the values of said slave addresses and said EEPROM addresses.

26. The host I²C controller of claim 25, wherein:

said accelerated I²C EEPROM reading unit coupled to said data control unit stores a current slave address when said host I²C controller accesses a slave device for a read operation, stores a current EEPROM address if said slave device is an I²C EEPROM, compares a requested slave address with said stored current slave address, compares a requested EEPROM address with said stored current EEPROM address if said requested slave address matches said stored current slave address, executes a current address read of an I²C EEPROM corresponding to said requested slave address if said requested EEPROM address matches said stored current EEPROM address, executes a random read of an I²C EEPROM corresponding to said requested slave address if said requested slave address does not match said stored current EEPROM address, executes a random read of an I²C EEPROM corresponding to said requested slave address if the requested device select code does not match the stored device select code, and executes a random read of a slave device corresponding to said requested slave address if the requested slave type code does not match the stored slave type code;

wherein said stored current slave address includes a stored slave type code and a stored device select code.

27. The host I²C controller of claim 25, wherein said accelerated I²C EEPROM reading unit comprises:

a current slave address register for storing a slave type code and a device select code of the current slave device accessed by a read operation;

a current EEPROM address counter for storing an address of a current EEPROM accessed by a read operation;

a slave address/EEPROM address comparator for comparing a requested slave address with a stored current slave address and for comparing a requested EEPROM address with a stored current EEPROM address; and an accelerated I²C EEPROM control unit for providing control signals to said current slave address register, to said current I²C EEPROM address counter, to said slave address/EEPROM address comparator, and to said data control unit, wherein said current EEPROM address counter is incremented after each current address read of said EEPROM.

28. The host I²C controller of claim 27, wherein said current slave address register is a seven bit register.

29. The host I²C controller of claim 28, wherein the four most significant bits of said current slave address register is a field for said slave type code.

30. The host I²C controller of claim 28, wherein the three least significant bits of said current slave address register is a field for said device select code.

31. The host I²C controller of claim 27, wherein said current I²C EEPROM address counter is a sixteen bit counter.

32. The host I²C controller of claim 31, wherein the eight most significant bits of said current I²C EEPROM address counter is a field for the first address byte.

33. The host I²C controller of claim 31, wherein the eight least significant bits of said current EEPROM address counter is a field for the second address byte.

34. The host I²C controller of claim 27, wherein said slave address/EEPROM address comparator is a twenty-three bit comparator.

35. The host I²C controller of claim 27, wherein said accelerated I²C EEPROM reading unit snoops read requests to a slave device a byte at a time.

36. A method of accelerating the reading of I²C (inter-integrated circuit) EEPROMs in a computer system, each I²C EEPROM supporting a random read operation and a current address read operation, comprising the steps of:

requesting a random read operation in a random read address of an I²C EEPROM in the computer system;

storing the requested random read address;

executing a random read of the requested I²C EEPROM based on said requested random read address;

snooping a subsequent read request to a random read address of an I²C EEPROM in the computer system;

executing a current address read of said requested I²C EEPROM if the requested I²C EEPROM is the previously read I²C EEPROM and the requested random read address matches the stored previously accessed random read address;

executing a random address read of said requested I²C EEPROM if the requested I²C EEPROM is not the previously read accessed I²C EEPROM; and executing a random address read of said requested I²C EEPROM if the requested random read address does not match said stored previously accessed random read address.

37. The method of claim 36, further comprising the steps of:

snooping a read request to an I²C slave device in a computer system wherein the slave device has a slave address including a slave type code and a device select code.

38. The method of claim 37, further comprising the step of:

comparing the requested slave type code with the slave type code for an I²C EEPROM.

39. The method of claim 37, further comprising the step of:

executing a random read of the requested slave device if said requested slave device is not an EEPROM.

40. The method of claim 37, further comprising the steps of:

comparing the requested device select code with the stored device select code to determine if the requested I²C EEPROM is the previously read I²C EEPROM; and storing said requested device select code if said requested I²C EEPROM is not said previously read I²C EEPROM.

41. The method of claim 37, the requested I²C EEPROM and the previously read EEPROM both having random read addresses; further comprising the steps of:

comparing said requested random read address with said stored random read address to determine if said requested random read address matches said stored previously accessed random read address;

storing said requested random read address if said requested random read address does not match said stored previously accessed random read address; and incrementing said stored previously accessed random read address if said requested random read address matches said stored previously accessed random read address.

* * * * *